Sept. 15, 1953 W. N. WEAST 2,651,983
MECHANICAL TURN LIFT
Filed Sept. 2, 1949 3 Sheets-Sheet 1

Willie N. Weast
INVENTOR.

BY *Clarence A. O'Brien*
*and Harvey B. Jacobson*
Attorneys

Sept. 15, 1953  W. N. WEAST  2,651,983
MECHANICAL TURN LIFT
Filed Sept. 2, 1949  3 Sheets-Sheet 2
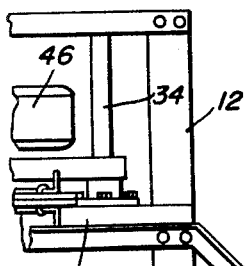
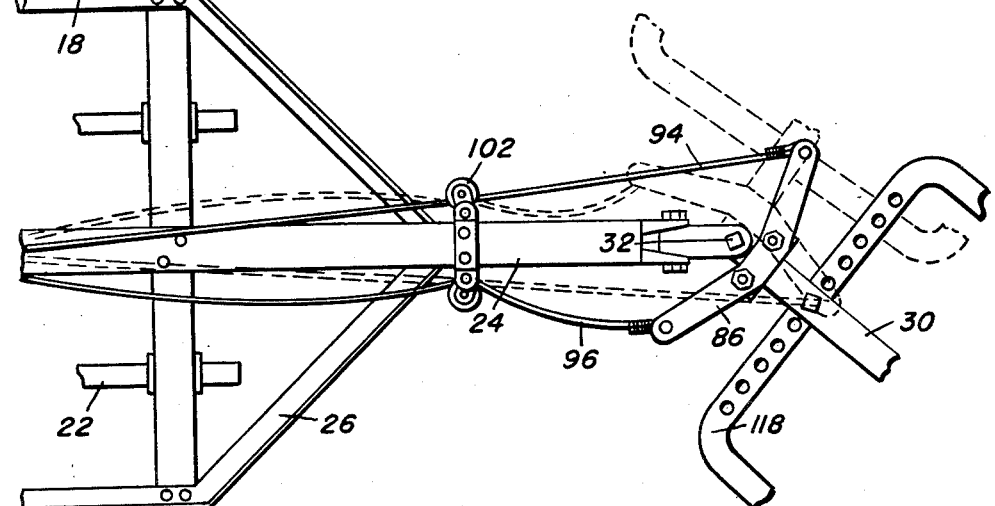
Fig. 2.
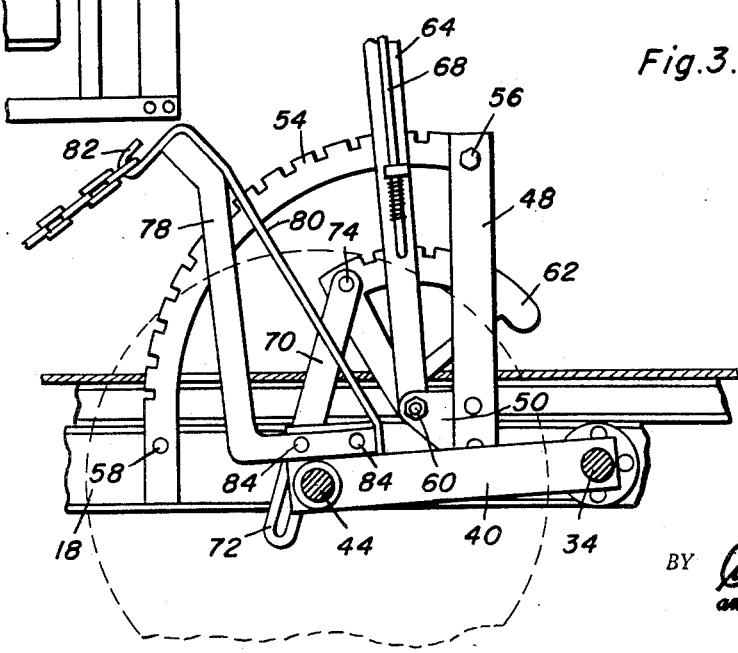
Fig. 3.
Willie N. Weast
INVENTOR.
BY

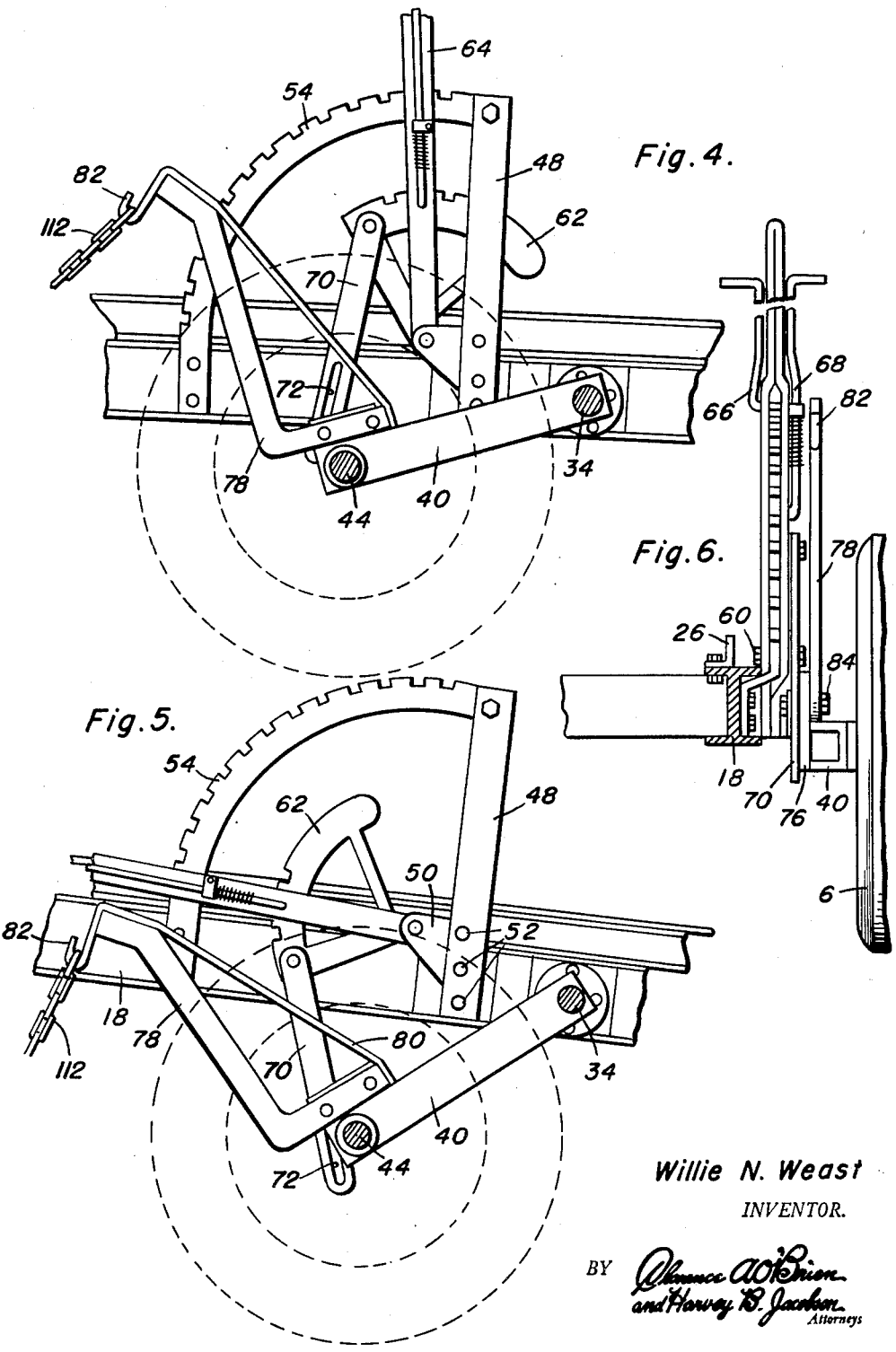

Patented Sept. 15, 1953

2,651,983

UNITED STATES PATENT OFFICE 2,651,983.

MECHANICAL TURN LIFT

Willie N. Weast, Silverton, Tex.

Application September 2, 1949, Serial No. 113,715

5 Claims. (Cl. 97—46.87)

1

This invention relates to a power lift, and more particularly pertains to an automatic lift for use with farming implements, such as chisel type plows or the like, for raising ground working elements from the ground upon making a turn.

The primary object of the present invention is to provide an automatic lift for farming implements, whereby the working tools are raised from the ground while making a turn and lowered for the straightway.

An important object of the present invention is to provide a lift in accordance with the foregoing object that may be easily attached to known farming implements in a manner requiring a minimum of mechanical skill.

Another important object is to provide a device in conformity with the foregoing objects that is readily adjustable to implements of various size, sturdy and dependable for the purposes intended, and which is of light and inexpensive construction.

An important feature of the present invention is the compact arrangement of the lift with the remainder of the implement and the arrangement being such that the power lift does not interfere with the manual means of adjusting the ground working elements.

These, together with various ancillary features and objects of the invention which will later become apparent as the following description proceeds, are attained by the present invention, a preferred embodiment of which has been illustrated by way of example only in the accompanying drawings, wherein:

Figure 2 is a fragmentary top plan view similar to Figure 1, showing in full lines the draw bar turning the plow to the right and to the left in dotted outline;

Figure 3 is a fragmentary vertical longitudinal sectional view showing the frame and wheel axle in normal plowing relationship;

Figure 4 is similar to the view shown in Figure 3; however, the parts are shown in the position automatically assumed on a turn;

Figure 5 is similar to Figures 3 and 4; however, the parts are shown in the position assumed upon manually raising the frame relative to the wheel axle;

Figure 6 is a vertical transverse detail sectional view taken upon the plane of the section line 6—6 of Figure 1; and,

2

Figure 1:
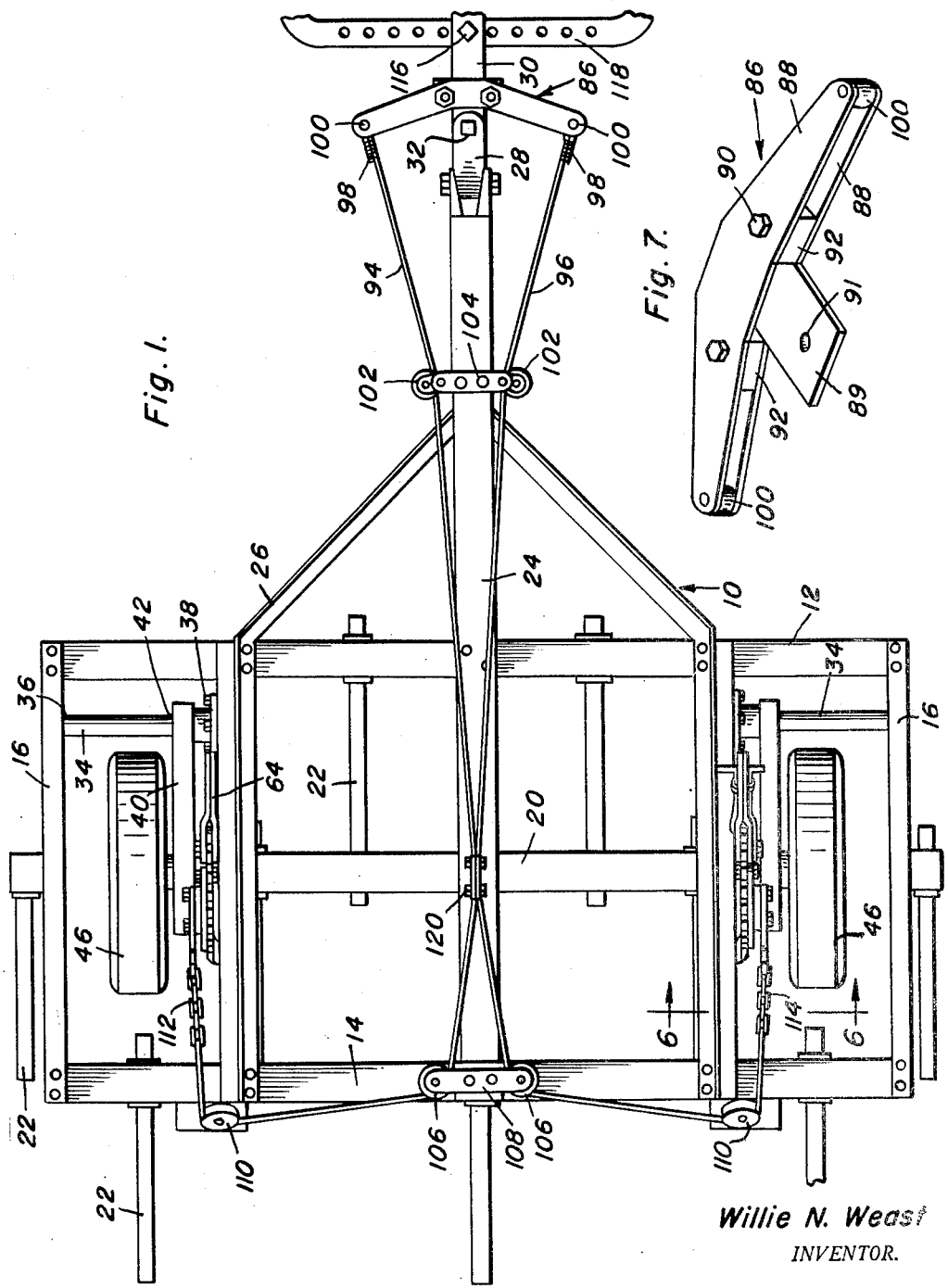
Figure 1 is a plan view of the present invention showing the same applied to a chisel type plow and the draw bar of a tractor with parts being broken away.

Figure 7 is a perspective view of the draw bar attachment.

Reference is now made more specifically to the accompanying drawings, wherein like numerals designate similar parts throughout the various views.

The present invention is illustrated as being applied to a known type of chisel plow; however, it is contemplated that the lift principle herein disclosed may be applied to a large variety of implements as will be readily perceived as this description proceeds. The chisel type plow indicated generally by the numeral 10 comprises a frame formed of transverse members 12 and 14 to which are secured longitudinal members 16 and 18. The members 18 are centrally braced by a transverse member 20, and plow blades 22 are suitably attached to the underside of members 12, 14, 16, and 20.

The frame is provided with a forwardly extending tongue 24, which is suitably secured to members 12 and 14 and is braced by forwardly converging angles 26. The forward end of the tongue 24 is provided with a suitable coupling 28, preferably of the universal type, and is attached to draft bar 30 of a suitable towing vehicle, not shown, by a pin 32.

To support the frame, shafts 34 are journaled in members 16 and 18 as at 36 and 38, to which are suitably secured crank arms 40 as at 42. Axles 44 are carried on the arms 40 for wheels 46.

It will be seen that oscillation of shafts 34 will raise and lower the wheels 46 relative to frame, thus varying the penetration of plows 22. The plow 10 may include manual means for oscillating and latching each of the shafts 34 in adjusted position, which conveniently consists of a standard formed of spaced strips 48 having an ear 50 therebetween and being secured to member 18 as at 52. A latch segment 54 has one end secured between the strips 48 as at 56 and the other fastened to the member 18 as at 58. Pivoted to the ear 50 as at 60 is latch segment 62 and lever 64. The lever is provided with spring driven latch bolts 66 and 68 for selected engagement with segments 54 and 62.

The construction so far set forth is conventional and will be readily understood by those skilled in the art; however, in the present invention the segment 62 is not connected to the arm 40 by a common pitman, but rather a link 70 having a slot 72 is provided that is pivotally secured to the segment 62 as at 74. A plate 76 is suitably attached to the crank arm 40 to which a triangular actuator arm is attached. The actuator arm is formed of a substantially L-shaped bar 78 and a strap 80. The strap 80 is preferably welded to the bar 78 and has a hooked end portion 82 for a purpose to be later set forth. The actuator arm is secured to the plate 76 by bolts 84, one of which extends through the slot 72 to pivotally secure the link 70 to the crank arm 40.

It will be evident (see Figures 3, 4, and 5) that the wheel position may be controlled by the lever 64 and latched in any desired position, since the thrust of the axle 44 is directed upward relative to the frame, and the bolt 84 will remain in the upper end of the slot 72. Up to this point the operation of device is conventional; however, it is apparent that the wheels are free to move downward by virtue of the freedom of the bolt 84 in the slot 72, and that this movement may be accomplished by rotation of the triangular arm. Therefore, the link 70 serves, by the manual means, to position the wheels, yet permits the frame to be raised without necessitating any adjustment of the manual means. If manually operated means are not desired on the machine, it is clear that the upper end of link 70 would simply be pivoted to the frame at a suitable position and that the triangular arm would still serve to raise the frame.

A lever 86, preferably of swept back shape, is formed of parallel plates 88 held together by bolts 90 with spacers 92 therebetween. The spacers 92 are of such size that the draft bar 30 is snugly embraced by the plates 88 and spacers 92. It is to be noted that the spacers may be rectangular or square with eccentrically located bolt holes for bolts 90 to provide adjustment for draft bars of different widths. A projection 89 extends rearwardly from one of the plates 88 with an opening 91 to receive pin 32 thereby denying rearward movement of the lever 86 on draft bar 30.

As shown in Figure 1, cables 94 and 96 are fastened, as at 98, to spools 100 on the lever 86 and are entrained rearwardly over hinged pulleys 102 carried on the tongue 24 by bracket 104, and pulleys 106 carried by bracket 108. The cables then extend laterally through pulleys 110, thence upwardly and forwardly. It is desired to secure a few links of chain 112 and 114 to the end of the cables 94 and 96, to provide adjustment in securing the cable ends to the hooks 82.

While it is desirable that the draft bar 30 always be in longitudinal alignment with the towing means, the bar 30 may be simply secured by means of a pin 116 inserted through the draft bar 30 and the proper aperture of cross bar 118.

From the foregoing description, it is believed that the operation of the lift will be readily understood. Referring to Figure 2, it will be seen that upon turning the towing vehicle to the right that cable 94 will be tensioned, which will lower the left wheel, thereby lifting the left side of the plow frame. This will greatly reduce the drag on the towing vehicle, as the lifted plows are those on the outside of the turn. The dotted outline showing a left turn shows the same operation for the right side of the plow.

Although lifting the plows on the outside of a curve is very effective, it is usually desired that all plows may be raised simultaneously. Since one cable is slacked by lever 86 as the other cable is tensioned, a cable clamp 120 is provided which causes both cables to be tensioned rearwardly thereof upon the lever 86 tensioning either of them, thus raising all plows 22 simultaneously.

The advantages of the present invention are numerous. The principle of the present invention is applicable to a great variety of farm implements already in existence, which would require an exceedingly small amount of modification to adopt, and very little material or expense. The owners of present equipment, may therefore easily modify their implements to save time and inconvenience in operating in hardpan or the like, by not having to shift gears or manually raise the plows on turns.

Another advantage resides in the manner in which the automatic lift cooperates with the mechanism for manually controlling plowing depth.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention, what is claimed as new is:

1. In a power lift for agricultural implements, a frame, a crank having its upper end pivoted to said frame for vertical swinging movement, an axle carried at the lower end of said crank having a wheel rotatably mounted thereon, a link provided with an aperture and an elongated slot therein, pivot pins carried by said frame and said axle, one of said pins being pivotally received in said aperture, the other of said pins being slidably and pivotally received in said slot, manually operable means carried by said frame for adjusting the vertical position of the pin carried by said frame relative thereto, an upwardly extending bar rigidly secured to said lower end of said crank, a flexible member having a first end secured to an upper end of said bar, said flexible member being entrained over guide means depending from said frame, a second end of said flexible member being connectable to a towing vehicle whereby turning of said frame from a straight path by the towing vehicle will impart a downward thrust on the upper end of said bar to pivot said crank within the limits of the connection between said slot and its associated pin.

2. In a power lift for agricultural implements, a frame, a crank having its upper end pivoted to said frame for vertical swinging movement, an axle carried at the lower end of said crank having a wheel rotatably mounted thereon, a link provided with an aperture and an elongated slot in opposite ends thereof, a first pin pivotally received in said aperture, said first pin being carried by manually operable means carried by said frame for adjustably vertically positioning said first pin relative to said frame, a second pin operatively connected to said crank, said second pin being slidably and pivotally received in said slot, an upwardly extending bar rigidly secured to said lower end of said crank, a flexible member having a first end secured to an upper end of said bar, said flexible member being entrained over guide means depending from said frame, a second end of said flexible member being connectable to a towing vehicle whereby turning of said frame from a straight path by the towing vehicle will impart a downward thrust on the upper end of said bar to pivot said crank within the limits of the connection between said slot and its associated pin.

3. The power lift of claim 2 wherein said second pin is carried by said bar.

4. In a power lift for agricultural implements, a frame, a crank having its upper end pivoted to said frame for vertical swinging movement, an axle carried at the lower end of said crank having a wheel rotatably mounted thereon, a link provided with an aperture and an elongated slot therein, pivot pins carried by said frame and said axle, one of said pins being pivotally received in said aperture, the other of said pins being slidably and pivotally received in said slot, manually operable means carried by said frame for adjusting the vertical position of the pin carried by said frame relative thereto, an upwardly extending bar rigidly secured to said lower end of said crank, a flexible member having a first end secured to an upper end of said bar, said flexible member being entrained over guide means depending from said frame, a second end of said flexible member being connected to a lever carried by a tongue of said frame, said lever being operative in response to movement of a towing vehicle relative to said frame to impart a downward thrust on the upper end of said bar to pivot said crank within the limits of the connection between said slot and its associated pin.

5. In an agricultural implement having a frame, a crank having its upper end pivoted to the frame for vertical swinging movement, an axle carried adjacent the lower end of said crank having a wheel rotatably mounted thereon, the improvement comprising the provision of a link pivotally carried by the frame, means carried by the frame for selectively vertically adjusting the link relative to the frame, a pivot pin carried by the lower end of the crank, the pivot pin being slidably and pivotally disposed in an elongated slot in a lower end of the link whereby the link forms an adjustable stop for the crank, an upwardly extending bar rigidly secured to said lower end of said crank, a flexible member having a first end secured to an upper end of said bar, said flexible member being entrained over guide means depending from said frame, a second end of said flexible member being connectable to a towing vehicle whereby turning of said frame from a straight path by the towing vehicle will impart a downward thrust on the upper end of said bar to pivot said crank within the limits of the connection between said slot and its associated pin.

WILLIE N. WEAST.

References Cited in the file of this patent

UNITED STATES PATENTS

| Number | Name | Date |
|---|---|---|
| 633,906 | Rife | Sept. 26, 1899 |
| 1,273,069 | Keckritz | July 16, 1918 |
| 2,297,788 | McGehee | Oct. 6, 1942 |
| 2,493,811 | Graham | Jan. 10, 1950 |

FOREIGN PATENTS

| Number | Country | Date |
|---|---|---|
| 12,190/28 | Australia | Dec. 31, 1928 |